(12) United States Patent
Darlage et al.

(10) Patent No.: US 12,152,746 B2
(45) Date of Patent: Nov. 26, 2024

(54) LUMINOUS DEVICE FOR AN AUTOMOTIVE VEHICLE

(71) Applicant: VALEO VISION, Bobigny (FR)

(72) Inventors: Colby Darlage, Troy, MI (US); Robert Fraizer, Auburn Hills, MI (US); Brian Guinn, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/071,963

(22) Filed: Nov. 30, 2022

(65) Prior Publication Data

US 2024/0175560 A1 May 30, 2024

(51) Int. Cl.
| | | |
|---|---|---|
| *F21S 41/24* | (2018.01) | |
| *B60Q 1/076* | (2006.01) | |
| *F21S 41/141* | (2018.01) | |
| *F21S 41/20* | (2018.01) | |
| *F21S 41/663* | (2018.01) | |
| *F21V 3/04* | (2018.01) | |
| *F21Y 115/10* | (2016.01) | |

(52) U.S. Cl.
CPC .............. *F21S 41/24* (2018.01); *B60Q 1/076* (2013.01); *F21S 41/141* (2018.01); *F21S 41/28* (2018.01); *F21S 41/663* (2018.01); *F21V 3/049* (2013.01); *F21Y 2115/10* (2016.08)

(58) Field of Classification Search
CPC ......... F21S 41/26; F21S 41/255; F21S 43/237
See application file for complete search history.

(56) References Cited

U.S. PATENT DOCUMENTS

| | | | |
|---|---|---|---|
| 6,670,207 B1 * | 12/2003 | Roberts ................ | B60Q 1/2665 257/E33.059 |
| 9,976,710 B2 | 5/2018 | Meir | |
| 10,473,303 B1 | 11/2019 | Wasilewski et al. | |
| (Continued) | | | |

FOREIGN PATENT DOCUMENTS

| | | |
|---|---|---|
| DE | 102004009193 A1 | 9/2005 |
| DE | 102004033758 A1 | 2/2006 |
| | (Continued) | |

OTHER PUBLICATIONS

International Search Report for Application No. PCT/US2023/081380, dated Mar. 1, 2024, 5 pgs.

(Continued)

*Primary Examiner* — Eric T Eide
(74) *Attorney, Agent, or Firm* — Young Basile Hanlon & MacFarlane, P.C.

(57) ABSTRACT

The present invention pertains to a luminous device of an automotive vehicle. The luminous device is configured to produce homogenous lit appearances when using multiple light sources. The luminous device comprises at least one light source for producing a light beam associated with a photometric function. Further, the at least one light source is encapsulated within an encapsulating material. The luminous device further comprises at least one optical element configured to produce said photometric function, wherein the at least one optical element is arranged juxtapose with said encapsulated light source and is configured to receive said light beam to perform at least one said photometric function of the luminance device.

20 Claims, 8 Drawing Sheets

(56) References Cited

U.S. PATENT DOCUMENTS

| | | | | |
|---|---|---|---|---|
| 2004/0004827 | A1* | 1/2004 | Guest | G02B 6/0091 |
| | | | | 362/249.06 |
| 2014/0146543 | A1 | 5/2014 | Ben Levy | |
| 2014/0268865 | A1* | 9/2014 | Matthew | G02B 6/001 |
| | | | | 362/558 |
| 2017/0347437 | A1* | 11/2017 | Hager | F21V 7/0091 |
| 2019/0118702 | A1* | 4/2019 | Shikata | B60Q 1/2607 |
| 2019/0275925 | A1* | 9/2019 | Chen | G02B 6/009 |
| 2021/0199871 | A1 | 7/2021 | Cohoon et al. | |

FOREIGN PATENT DOCUMENTS

| | | |
|---|---|---|
| DE | 102005048498 A1 | 4/2007 |
| EP | 2568212 A1 | 3/2013 |
| EP | 3306179 A1 | 4/2018 |
| EP | 3539825 A1 | 9/2019 |
| EP | 3674138 A1 | 7/2020 |
| EP | 3943804 A1 | 1/2022 |
| TW | 202024522 A | 7/2020 |
| WO | 2021182826 A1 | 9/2021 |
| WO | 2021247935 A1 | 12/2021 |

OTHER PUBLICATIONS

Written Opinion for Applicaion No. PCT/US2023/081380, dated Mar. 1, 2024, 7 pages.

* cited by examiner

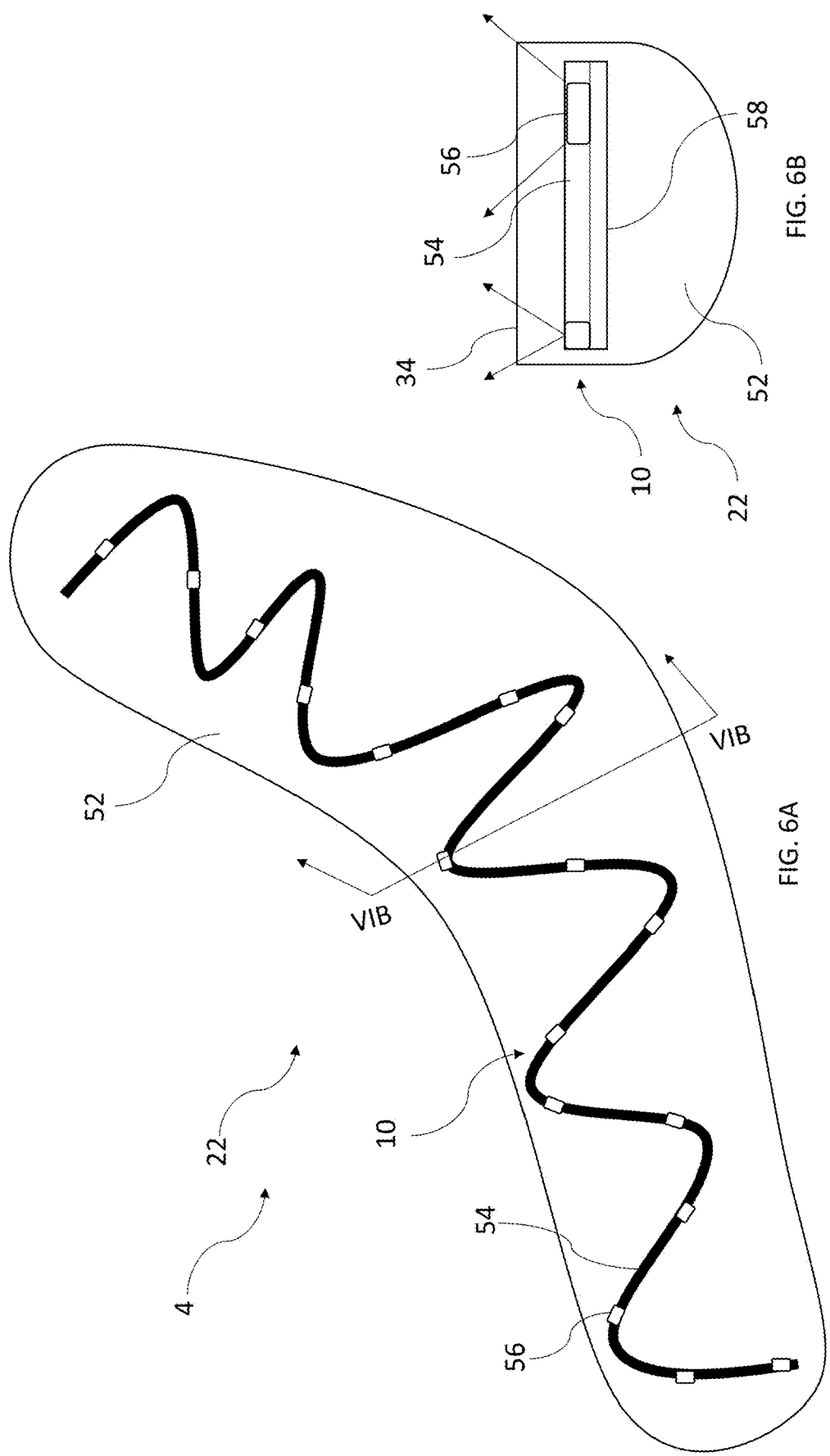

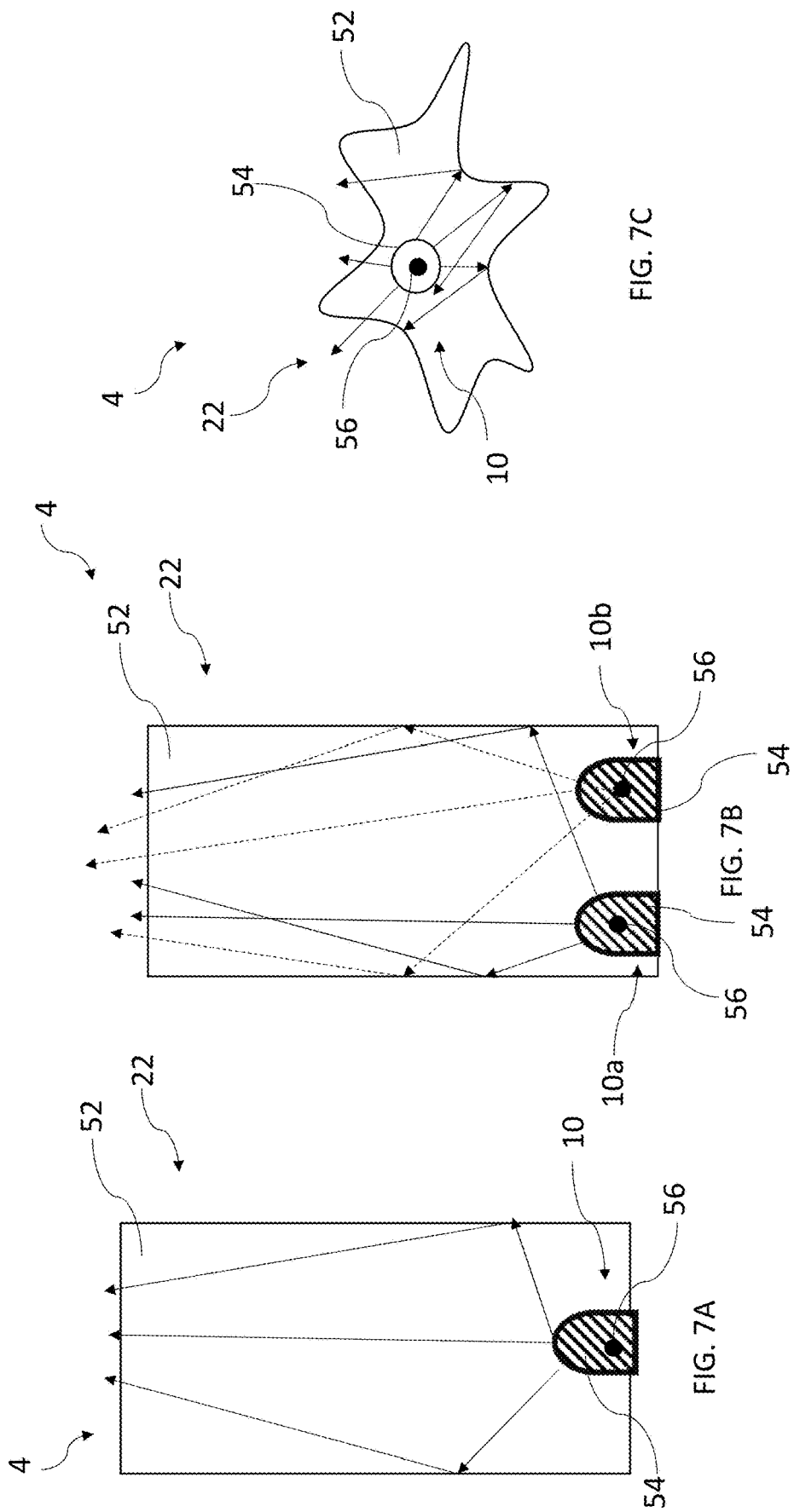

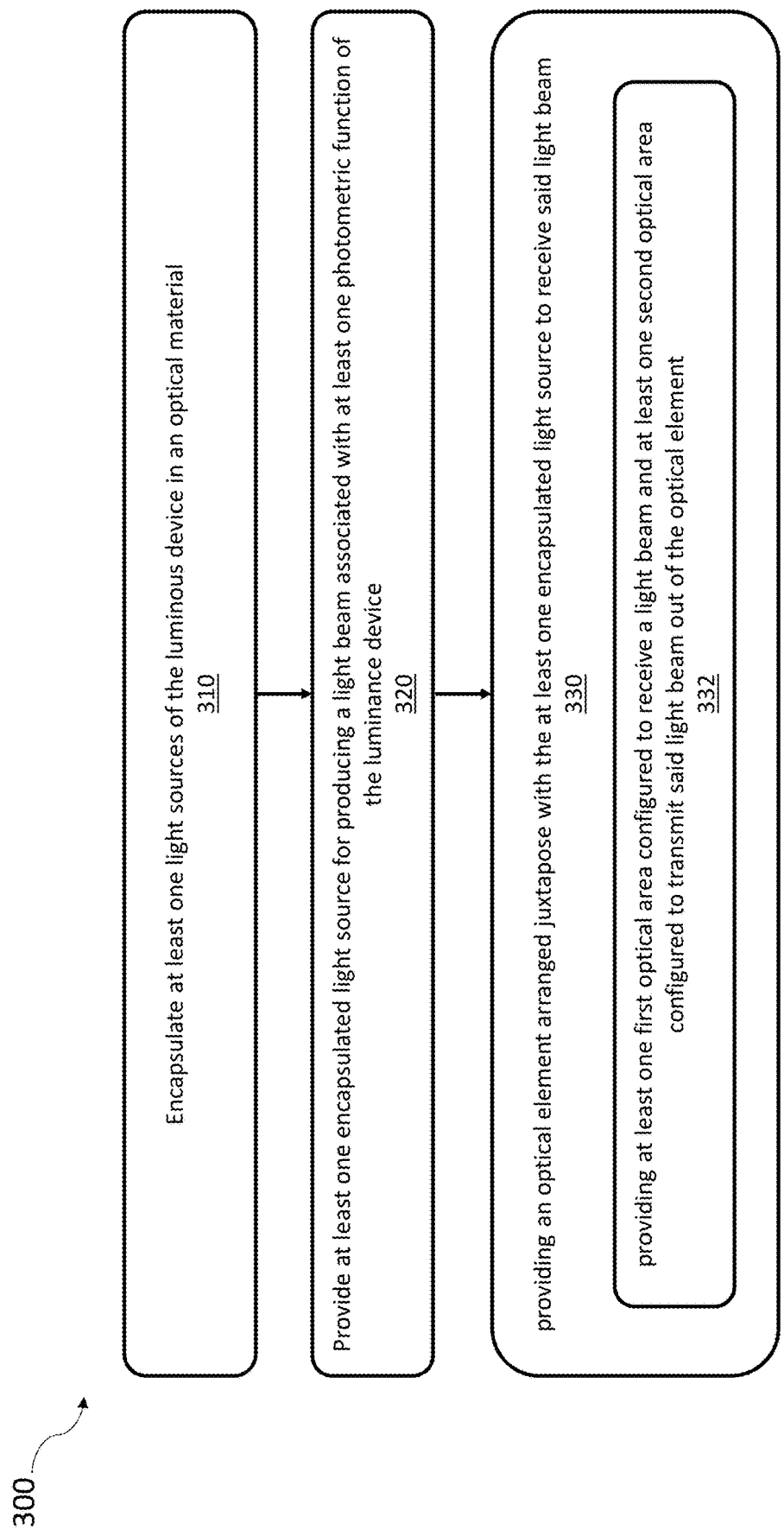

LUMINOUS DEVICE FOR AN AUTOMOTIVE VEHICLE

FIELD

The present teachings relate to a luminous device that is includable within an automobile and more particularly, a luminous device having an encapsulated light source arranged in relation to an optical element to produce a homogenous light pattern that meets regulatory requirements, a signature function, or both.

BACKGROUND

Lighting devices are used in automobiles to illuminate a region around the automobiles or to provide notice to surrounding automobiles. These lighting modules are designed to produce distinct lights beam to provide different lighting functions such as high beam, low beam, turn indicator, day running lights, or a combination thereof. The indicated lighting functions use specific light sources and are required by regulations to meet certain lighting conditions.

Conventionally, vehicle headlamp and headlights may also be used for distinguishing the vehicle forward and rear direction based on the type of lighting function. These lighting devices are arranged symmetrically on the either side of vehicle. Attempts have been made create lighting devices that both provide lighting functions and are aesthetically pleasing. What is needed is a light with a complex shape that meets regulatory standards while providing one or more different lighting colors or functions. It would be advantageous to have system that provides an exterior lamp that has a signature function with the exterior lamp having an irregular shape. What is needed is an exterior light with a light source embedded within a lens or over molded within a lens such that the exterior light is substantially flat, is an irregular shape, or both.

SUMMARY

The present teachings provide a luminous device comprising at least one light source that produces a light beam associated with a photometric function of the luminance device, wherein the at least one light source is encapsulated within an encapsulating material, and at least one optical element configured to produce said photometric function, wherein the at least one optical element is arranged juxtapose with said encapsulated light source and is configured to receive said light beam to perform at least one said photometric function of the luminance device.

The present teachings provide an encapsulating material that encapsulates the light source is silicone, wherein the optical element comprises at least one first optical area configured to receive a light beam and at least one second optical area configured to transmit said light beam out of the optical element, wherein the first optical portion comprises optical structures configured to optically couple with the at least one light source to allow the light beam to enter the optical element, wherein the optical structures are formed as flat surfaces on the extreme ends of the optical element, wherein the optical structures are formed as grooves formed on the surface of the optical element, wherein each of the light sources are configured to produce different light beam to produce different photometric functions, wherein the optical member is made from a transparent material configured to allow transmission of light from the first optical area towards the second optical area, wherein the second optical area comprises a light diffusive portion configured to diffuse the light beam to produce a diffusive light pattern, wherein the light diffusive portion is configured to cover at least a part of the second optical area, wherein the light beam entering at least one optical element is transmitted by total internal reflection, wherein the optical element is formed as a cylindrical structure, wherein the optical element is formed as a hollow tubular structure, wherein the at least one encapsulated light source is directly molded on the at least one optical element.

The present teachings provide a method including a luminous device that produces a homogenous lit appearance, the method comprising the steps of providing at least one light source for producing a light beam associated with at least one photometric function of the luminous device and providing an optical element arranged juxtapose with the at least one light source to receive said light beam.

The present teachings may provide a method that further comprises providing at least one first optical area configured to receive a light beam and at least one second optical area configured to transmit said light beam out of the optical element, wherein method comprises providing optical structures on the first optical area configured to optically couple with the at least one light source, wherein the method comprises providing the optical member with a transparent portion configured to allow transmission of light from the first optical area towards the second optical area, wherein method comprises providing a light diffusive portion on the second optical portion to produce a diffusive light pattern.

The present teachings provide a light with a complex shape that meets regulatory standards while providing one or more different lighting colors or functions. The present teachings provide a system that provides an exterior lamp that has a signature function with the exterior lamp having an irregular shape. The present teachings provide an exterior light with a light source embedded within a lens or over molded within a lens such that the exterior light is substantially flat, is an irregular shape, or both.

BRIEF DESCRIPTION OF THE DRAWINGS

To further provide a more encompassing description and a better understanding of the teachings, a set of drawings is provided. The drawings form an integral part of the description and illustrate aspects of the teachings, which should not be construed as restricting the scope of the teachings, but only as examples of how the teachings can be carried out.

FIG. 6A is a front plan view of a luminous device.

FIG. 6B is a cross-sectional view of the luminous device of FIG. 6A along line VIB-VIB.

FIG. 7A is a cross-sectional view of a luminous device having a single-color light source.

FIG. 7B is a cross-sectional view of a luminous device having a multiple light sources.

FIG. 7C is a cross-sectional view of an optical element having an irregular shape.

FIG. 8 illustrates a flow diagram of a process of forming a luminous device.

DETAILED DESCRIPTION

Figure 1:
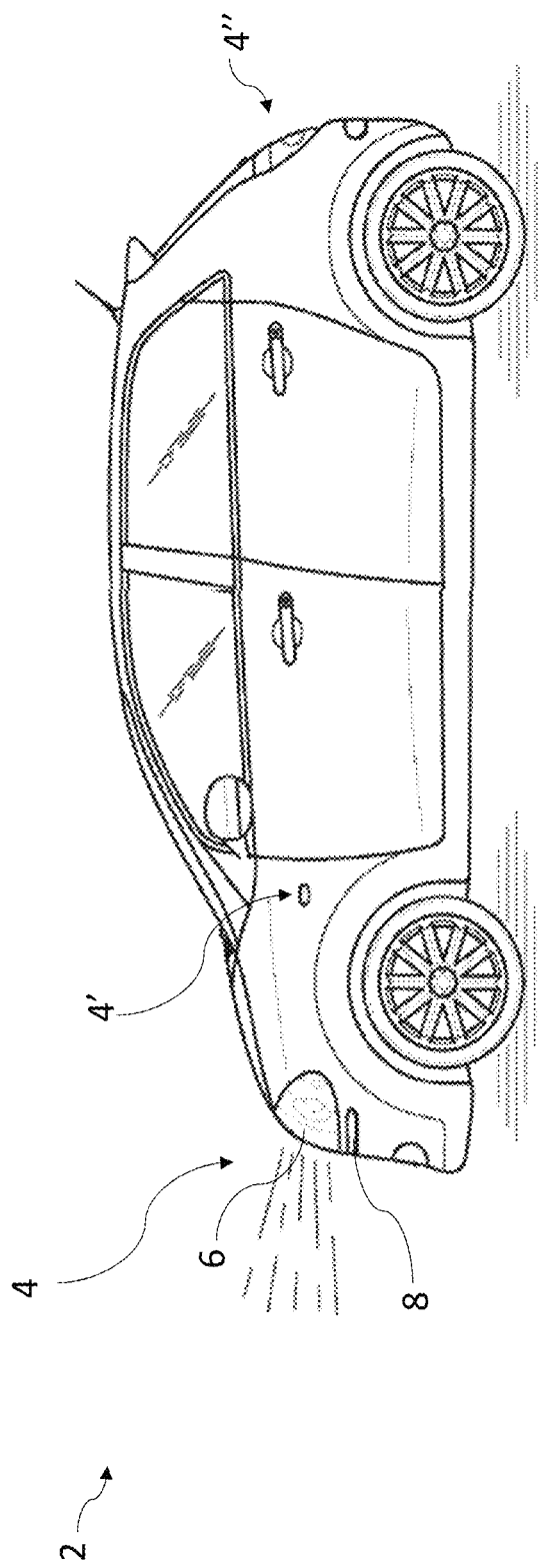
FIG. 1 is a side view of a vehicle including luminous devices.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to luminous devices (e.g., light systems). The luminous device is located within a vehicle. Preferably, the luminous device is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The luminous device may project in a forward direction, rear direction, side direction, or a combination thereof. Preferably, the luminous device projects a light from an external surface of the vehicle to a location in front of the vehicle or at an angle relative to the front or rear of a vehicle. The luminous device may direct some light at the ground. The luminous device may direct some light above the ground. The luminous device may be integrated into a front end, a rear end, or both of a car. The luminous device may be an assembly. The luminous device may be a sealed luminous device that is integrated into a vehicle. The luminous device may be a sub-assembly that is included in a larger luminous device. The luminous device may be integrated into another luminous device and may function to be part of the luminous device. The luminous device may project light out of the vehicle. The luminous devices may be multiple luminous devices stacked one above the other, side by side, within different planes, within a same plane and projecting in different direction, integrated into a single luminous device, or a combination thereof. The luminous device may have multiple smaller luminous devices or may perform with a plurality of luminous devices. The plurality of luminous devices may be located in one luminous device. The plurality of luminous devices may operate independently of one another such that one luminous device may not affect another luminous device or portion of the luminous device. The light of the vehicle may be two or more, three or more, or four or more luminous devices located adjacent one another. Each luminous device may have one or more light sources, two or more light sources, or a plurality of light sources.

The light sources function to produce light. The light source may be a device or a plurality of devices that create light and the light extends outward from the light source. The light source may produce a high beam, a low beam, a blending beam, a running light, a day time light, a turn signal, a brake light, or a combination thereof. The light sources may create different functions. For example, one light source may provide a running light and another light source may be a turn signal. The light sources may be in communication with a single optical element The light source may comprise a plurality of lights or may be a single light source within a set of light sources. The plurality of lights may be in one set or group of light sources. The light source may be a string of light sources that all work together to form a homogenous light, produce a homogeneous lighting appearance, or both. The light source may be a single light that projects light. In another example, a light source may direct light in a first direction and a second light source may direct light in a second direction that is different from the first direction. The first direction may be along a z-axis within a coordinate system. The second direction may be along an x-axis within a coordinate system. The light source may include a laser diode, glowing phosphor, filament bulb, a light emitting diode, a halogenated light, a xenon light, or a combination thereof. One light source or set of light sources may produce one light function and a second light source or set of light sources may produce a second light function. The present teachings may provide a plurality of light functions (e.g., 2, 3, 4, or even 5) through a single luminous device.

The first light function and the second light function may be different functions. The first light function and the second light function may pass through the same optical element. A plurality of light functions may pass through a single optical element (e.g., three different light functions). The first light function and the second light function may operate at the same time. The first light function and the second light function may operate at different times. The first light function and the second light function may be optically isolated. The first light function and the second light function may be mechanically connected. The first light function and the second light function may be indirectly connected. The first light function and the second light function may be connected via an optical element. The first light function and the second light function (e.g., first light source and second light source) may be free of direct connection. The first light function and the second light function may be located on a same side of a vehicle or adjacent sides of a vehicle. The first light function and the second light function may both be located in a front of a vehicle or in a rear of a vehicle. The first light function and the second light function may provide different colored lights. For example, a first light function may provide white light (e.g., a drl) and a second light function may provide a colored light (e.g., a turn signal or stop light). The system may be located in corners of the vehicle (e.g., drivers side front and passenger side front). The first light function may be a daytime running light. The second light function may be a turn signal. Each of the light functions may include an independent light source or set of light sources. The first light function and the second light function may extend through a same lens, a single lens, or multiple lenses (e.g., optical element as discussed herein).

The light source may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, 11 or more light sources, 15 or more light sources, 20 or more light sources, or even 25 or more light sources that produce light and combine together to form the light extending from the light system. The sets of light sources may include 100 or less, 75 or less, 16 or less, or 50 or less light sources that produce light. For example, the set of light sources may be in communication with contents of a single printed circuit board that perform a same lighting function. The number of light sources in a part of the light may dependent upon a size of the region or a size illuminated. For example, a daytime running light may have eight or more light sources and a turn signal may have five or more light sources. Thus, the light source may be one or more lights, two or more lights, or three or more lights. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements, textured portions, micro-optics, or reflectors (e.g., a light guide). Each device of the light source may be turned on and off. The light sources may be illuminated in a sequence. For example, when one set of light sources is turned on another set of light sources may be turned off and vice versa.

The set of light sources function to fill a light bar, a lens, an outer housing, an outer lens, or a combination thereof with light so that the light bar, lens, outer housing, or a combination thereof project light to perform some function. Each of the sets of light sources may perform a different function or provide a different type of light. All of the lights within a set of light sources may provide the same light (e.g., color, color temperature, or wavelength). For example, one set of light sources may be yellow, orange, or red and a second set of light sources may be white (e.g., OEM white, off white, pure white, or crystal white (e.g., having a color temperature between 4300K and 6000K). The color, intensity, temperature, or a combination thereof may vary from set to set depending on the function of the set of light sources. For example, if one set of light sources is directed to a turn signal then the color may be orange whereas if the set of light sources is for a brake light then the color may be red. The light from the light system may be directed to a predetermined location depending on a function of the light from that set of light sources. For example, a running light may be directed outward in front of a vehicle whereas a turn signal may be directed at a 45 degree angle so that a portion of the light is visible in a front of the vehicle and a portion of the light is visible from a side of the vehicle.

Each of the set of light sources may direct light into an optical element. A plurality of sets of light sources may direct light into a same optical element. The light from the first light function and the light from the second light function may extend through an optical element (e.g., a lens). The first light function and the second light function may have discrete lenses that are spaced apart. The first light function and the second light function may have mechanically connected lenses. The first light function and the second light function may each have a lens with a clear portion, a textured portion a texture shutoff, a portion of a blocker, or a combination thereof. The light functions (e.g., the light sources that generate the light function) may include lights, light supports, light material, or a combination thereof.

The light sources may be one or more lights or a plurality of lights combined together to perform a light function. The lights may be a plurality of lights that work in tandem to provide light. The lights may be an LED. The lights may be located on a light support.

The light support may be a printed circuit board, a flexible printed circuit board, or both. Each light may include its own light support. A single light support may support a plurality of lights. Preferably, each light is in communication with a single light support or is free of communication with a light support such that the light operates when power or a signal is provided. The light supports, the lights, or both may be in communication with an optical material.

The optical material may be any material that covers all or a portion of a light source, encapsulates a light, encapsulates a light support, covers a light, covers a light support, or a combination thereof. The optical material may be clear, colored, partially opaque, or a combination thereof. The optical material may have a melting temperature that is higher than a temperature of the lights. The optical material may be hydrophobic. The optical material may be flexible. The optical material may have some elasticity or elastomers properties. The optical material may elastically deform. The optical materials may cover, surround, encapsulate, enclose, or a combination thereof a plurality of lights, a plurality of light supports, or both. The optical materials when covering the lights, the light supports, or both may prevent fluids from contacting the lights, the light supports, or both. The optical material may assist the light sources in being incorporated into another structure such as an optical element. The optical material may extend over one or more types of light sources. For example, the light sources may all be a white light. The optical material may extend over two or more types of light sources so that multiple light functions are incorporated into a single light source. The optical material may be made of or include silicone, polyurethane, polyethylene, polyester, or a combination thereof.

The first light function and the second light function may be in communication with an optical element and proximate to one or more lenses (e.g., internal lenses). A plurality of light functions may be incorporated into a single luminous device and more preferably a single optical element within a luminous device.

Automotive luminous devices (e.g., light system) are usually configured to provide one or more light functions so that a region around a vehicle is illuminated such as a forward direction, a rearward direction, along one or more sides, or a combination thereof of the vehicle. In addition, these luminous devices perform other photometric functions such as turn indicator (TI), daytime running light (DRL), stop light function, tail light function, hazard light function, or a combination thereof. These lighting functions may use different light sources that produce different color light beams as required by a lighting function. Alternatively, all of the light sources may provide white light and the material of the lights may be colored so that the luminous devices provide a desired light color. The light sources are usually provided in association with an optical element (e.g., optical device) such as a light guide, lens, an optic, light bar, reflector, collimator, pipe, or a combination thereof to produce a working light beam.

The optical elements are configured to produce a specific beam pattern or a specific light output that is able to achieve the regulatory requirement (for a particular light or group of lights) and in addition provide an efficient lighting or signaling function. The optical elements may be in contact with the light source. For example, the optical element may be a solid part and one or more light sources may be wrapped around, extend along, incorporated into, placed adjacent to, or a combination thereof along all or a portion of the optical element so that lights from the one or more light sources may be directed into the optical element and then guided to a predetermined location to provide a lighting function discussed herein. The optical element may direct different light functions in different direction. The optical element may direct all of the light functions in a same direction. The optical element may encapsulate and/or surround all or a portion of one or more light sources, over mold all or a portion of one or more light sources, or both. One or more sets of light sources may extend within and/or through the optical elements. The optical elements may be made of an optical material. The optical material may be any material that transmits light to a region of interest, provides a lighting function, meets a regulatory function, provides a signature function, or a combination thereof. The optical elements may be made of a polymer. The optical elements may be made of acrylic, polycarbonate, or both. The optical elements may be colored to generate a colored light. The optical elements herein may be clear. The light sources may provide one or more colors that extend through the optical elements.

The optical elements may have virtually any shape that permits light to be directed to perform a function, illuminate a region, provide light, provide notice, meet a regulatory standard, meet a signature function, or a combination thereof. The optical elements may be a cylinder, a cube, a sphere, a cone, a cuboid, a triangular prism, a tetrahedron, an octahedron, a pentagonal prism, a hexagonal prism, an ellipsoid, a geometric shape, a non-geometric shape, symmetrical, asymmetrical, generally planar, curved, curved in an X-direction, curved in a Y-direction, curved in a Z-direction, or a combination thereof. The optical element may have a cross-sectional shape that is a circle, a square, a triangle, a rectangle, a diamond, an oval, a semi-circle, a heart, a hexagon, a pentagon, a trapezoid, a cross, a parallelogram, a crescent, symmetrical, asymmetrical, geometric, non-geometric, irregular, amorphous, or a combination thereof.

The optical element may have a region that receives light from one or more light sources (e.g., receiving region). The receiving region may receive light from one or more light sources, two or more light sources, three or more light sources, or four or more light sources. The optical element may have a region that directs light in a predetermined direction (e.g., directing region). The receiving region may provide light to the directing region. The receiving region and directing region may be parallel, perpendicular, at an angle, within different regions, or a combination thereof. The receiving region may direct light to the directing region. For example, the receiving region may be in communication with a white light source and a colored light source (e.g., yellow, orange, red) and the receiving region may direct the light from those light sources to the directing region via a light diffusive portion so that the directing region may direct the light to a predetermined location around a vehicle. Thus, the optical element may direct a white light through the direction region for a first period of time and then direct a colored light through the direction region for a second period of time. The first period of time and the second period of time may have some overlap or may be entirely discrete. For example, only a white light may extend through the optical element or only a colored light may extend through the optical element. The one or more lights may be located within the receiving region. For example, all or a portion of the optical element may extend over the one or more lights so that the one or more lights are within the optical element forming the receiving region. Thus, the light may effectively extend outward into the optical element (e.g., light diffusive portion) in virtually 360 degrees. The optical element may include multiple receiving regions along one or more walls of the optical element. An entire exterior of the optical element may be a direction region. A certain wall or direction of the optical element may include a direction region so that light is directed to a predetermined location.

The optical element may include one or more side walls, one or more end walls, or both forming an entire outer surface of the optical element. The light sources may be located next to one or more side walls, one or more end walls, or both. The optical element may be an irregular shape such that a direction of light and walls within the optical element is arranged relative to a direction of light. One or more light sources may be located adjacent to one or more side walls and one or more light sources may be located adjacent to one or more end walls. For example, a first white light source may project a light through an end wall (e.g., a receiving region) so that the light is projected out of the directing region (e.g. a second end wall). In another example, a white light source and a colored light source may be adjacent to a side wall (e.g., a receiving region) and the light may be directed through a directing region (e.g., an end wall, a side wall, or both). The directing region may face an exterior of a vehicle so that the light is directed outward from the vehicle. The directing region may be an exterior of the luminous device, a vehicle, or both. A luminous device may include one or more directing regions, two or more directing regions, or three or more directing regions. For example, each directing region may direct light to a different location or in a different direction. The light extending out of the luminous device is visible relative to the vehicle or around the vehicle. The optical elements may include light diffusive portions, transparent portions or both.

The transparent portions function to provide light to pass through the respective portion of the optical element. For example, the transparent portions may be an interior of an optical element. The transparent portions may allow light to pass through the optical element. The transparent portions may be clear, colored, entirely transparent, or a combination thereof. An optical element may include one or more, two or more, or even three of more transparent portions. One transparent portion may be clear and one transparent portion may be colored such that if white light passes through the transparent portion the light appears colored to an observer. The transparent portions may be a receiving region, a directing region, or both. The transparent portions may reflect light internally so that the light is directed to a direction region. The transparent portions may work in conjunction with light diffusive portions.

The light diffusive portions function to allow light to pass into the optical elements, pass out of the optical elements, or both. The light diffusive portions may allow light to pass into the optical elements, out of the optical elements, or both. The light diffusive portions may spread the light. The light diffusive portions may assist the light, when viewed external to the vehicle, to appear homogeneous. The light diffusive portions may be a receiving region, a directing region, or both. The light diffusive portions may be a texture or a break where light passes through a wall of the optical elements. The light diffusive portions may be located on or within a light guide.

The light guides function to guide light into or within optical elements. The light guides may be located on an exterior of the optical elements. The light guides may extend into an interior of the optical elements. The light guides may extend at an angle relative to exterior wall of the optical elements. The light guides may extend at an angle of about 5 degrees or more, 10 degrees or more, 15 degrees or more, 30 degrees or more, or about 45 degrees or more. The light guides may extend at an angle of about 90 degrees or less, about 75 degrees or less, about 60 degrees or less, or about 45 degrees or less. The angle may be determined based upon a function of a light source. Thus, a turn signal may have a light guide that extends at a first angle and a drl may extend at a second angle that is different from the first angle. The optical elements may be free of light guides. The light guides may be located in one or more light regions or free of being located in one or more light regions.

Each light region may be associated with a different light function. Two light regions may be combined together to provide a single light function. Each optical element may include one or more light regions, two or more light regions, or even three or more light regions. Each light region may be located adjacent to a set of light sources. A set of light sources may extend through a light region. The light regions may alternate with one another. For example, the optical element may include a first light source adjacent to a first light region, a second light source adjacent to a second light region, then a second first light region, and finally a second second light region. In another example, some light regions may be on an exterior and some light regions may be on an interior of the optical elements.

The present teachings provide a luminous device that may effectively perform various lighting functions ensuring a homogenous light appearance. Furthermore, the proposed luminous device may effectively provide a homogenous light appearance where multiple color functions are present. In addition, the luminous device may provide a neo effect lighting appearance ensuring the regulatory requirement, thus allowing a cost effective and stylish design for the luminous device. The luminous device may be created using a process.

The process may include forming a set of light sources. The process may apply a light material over one or more lights, one or more light supports, or both. The process may encapsulate all or a portion of a plurality of lights within a light material to form a set of light sources. The set of light sources may be connected to an optical material. The set of light sources may be enclosed within optical material forming an optical element. Two or more sets of light sources may be connected to or enclosed within an optical element. The one or more sets of lights may be bent and connected to the optical element. The one or more sets of lights may be bent or conformed to a predetermined shape.

FIG. 1 illustrates a side view of a vehicle comprising luminous devices 4, 4', and 4" (e.g., light systems). The luminous device 4 includes a headlight 6 and a daytime running light (DRL) 8.

Figure 2:
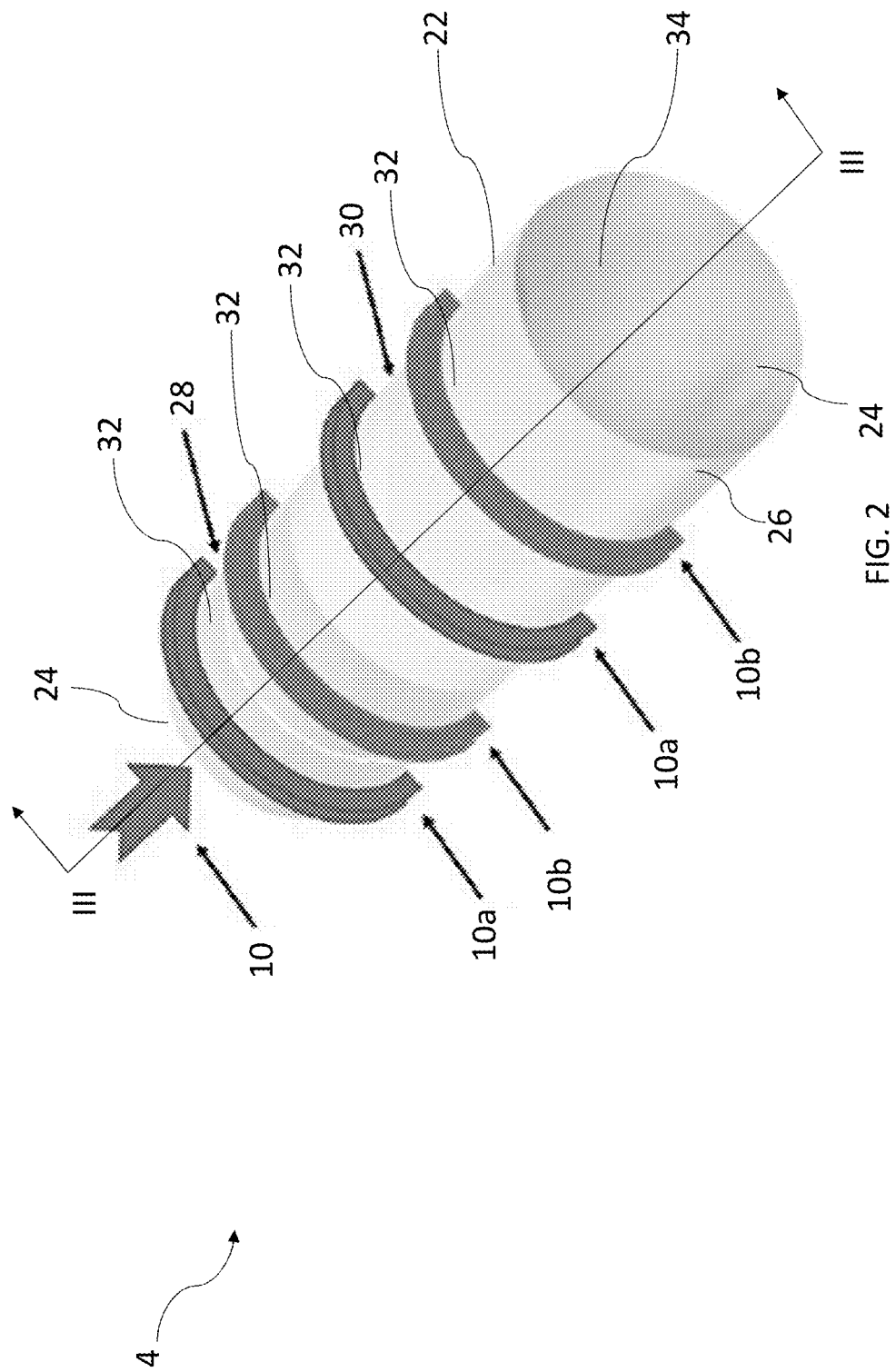
FIG. 2 shows an isometric view of a luminous device.

FIG. 2 is an isometric view of a luminous device 4. The luminous device 4 includes light sources 10, 10a, and 10b. The luminous device 4 includes an optical element 22 that includes end walls 24 connected by a side wall 26. The side wall 26 extends around light diffusive portions 28 and transparent portions 30 (e.g., areas inside of the optical element). The side wall 26 includes receiving regions 32 where light enters the optical element 22 and directing regions 34 where light exits the optical element 22. The receiving regions 32 may be or include light diffusive portions 28 and/or transparent portions 30. The light source 10 is located adjacent to an end wall 24 of the optical element 22. The light sources 10a and 10b are located along the side wall 26 in an alternating fashion and aligned with receiving portions 32 of the optical element 22 so that light extends through the receiving portions 32 into the light diffusive portion 28 and transparent portion 30 and out the direction region 34, which as shown is located within an end wall 24.

Figure 3:
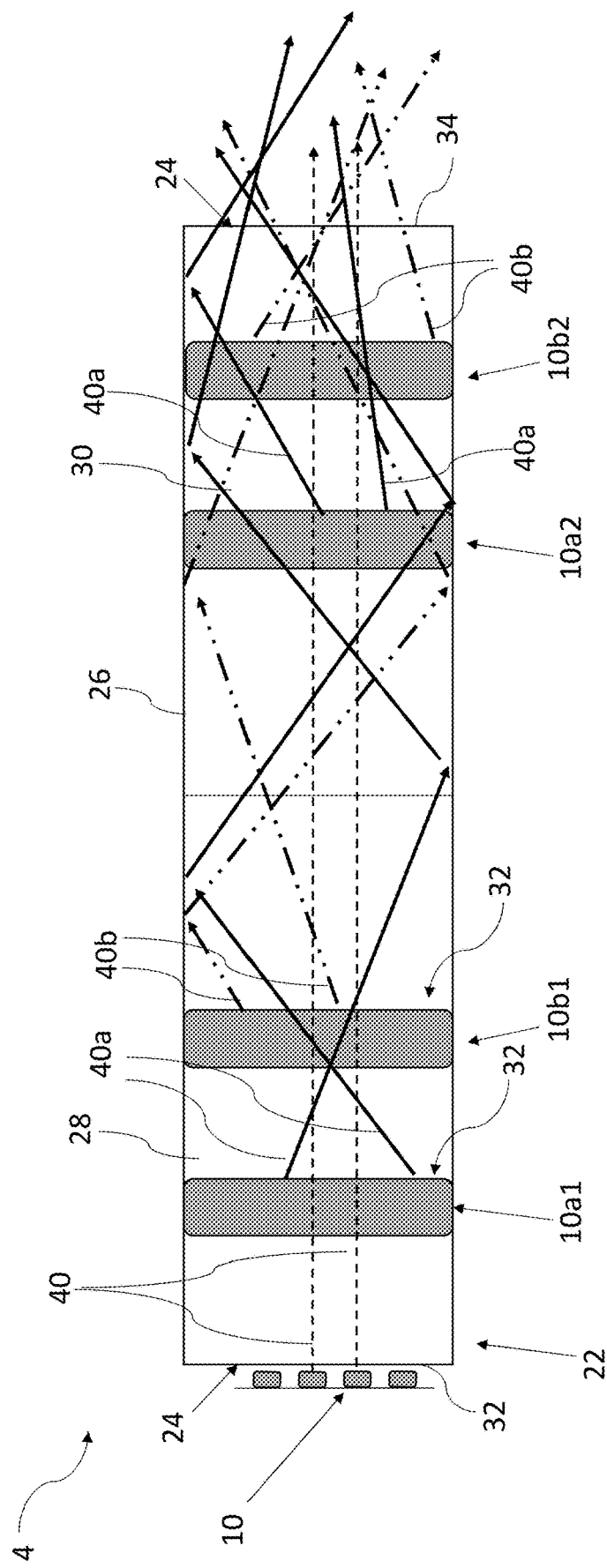
FIG. 3 shows a side cross-sectional view of the luminous device of FIG. 2 along lines III-III.

FIG. 3 is a cross-sectional view of the luminous device 4 of FIG. 2 along lines III-III. The luminous device 4 includes an optical element 22 and light sources 10, 10a, and 10b. The optical element 22 includes an exterior formed of two end walls 24 connected by a side wall 26. Inside of the optical element 22 are light diffusive portions 28 and transparent portions 30 that light passes through. A first set of light sources 10 are located adjacent to an end wall 24 so that light extends into an inside of the optical element 22 via the end wall 24 which is also a receiving region 32. As shown, light from the first set of light sources 10 extends directly through the optical element 22 via the light diffusive portions 28 and the transparent portions 30.

A second set of light sources 10a (10a1 and 10a2) direct light through the side wall 26 (e.g., through a receiving region 32) into the light diffusive portions 28 and the transparent portions 30. The second set of light sources 10a are wrapped around the side wall 26 and direct light through the side wall 26 radially inwardly. The second set of light sources 10a are located alternatively along a longitude of the optical element 22 with the third set of light sources 10b (10b1 and 10b2).

The third set of light sources 10b direct light through the side wall 26 (e.g., through a receiving region 32) into the light diffusive portions 28 and the transparent portions 30. The second set of light sources 10a and the third set of light sources 10b are arranged with light source 10a1, then light source 10b1, followed by light source 10a2, and ending with light source 10b2 with light source 10a1 and 10a2 working together and 10b1 and 10b2 working together. The light from the second set of light sources 10a and the third set of light sources 10b all is directed out the directing region 34 (e.g., end wall 24). However, if the optical element 22 is rotated within a vehicle (not shown) the light may extend out of a portion of a side wall 26. As shown, the first set of light sources 10 create the light 40, the second set of light sources 10a create the light 40a, and the third set of light sources 10b create the light 40b, all of which are directed out f the directing region 34 in a sufficient amount to meet a predetermined amount of light, a predetermined light function, or both.

Figure 4:
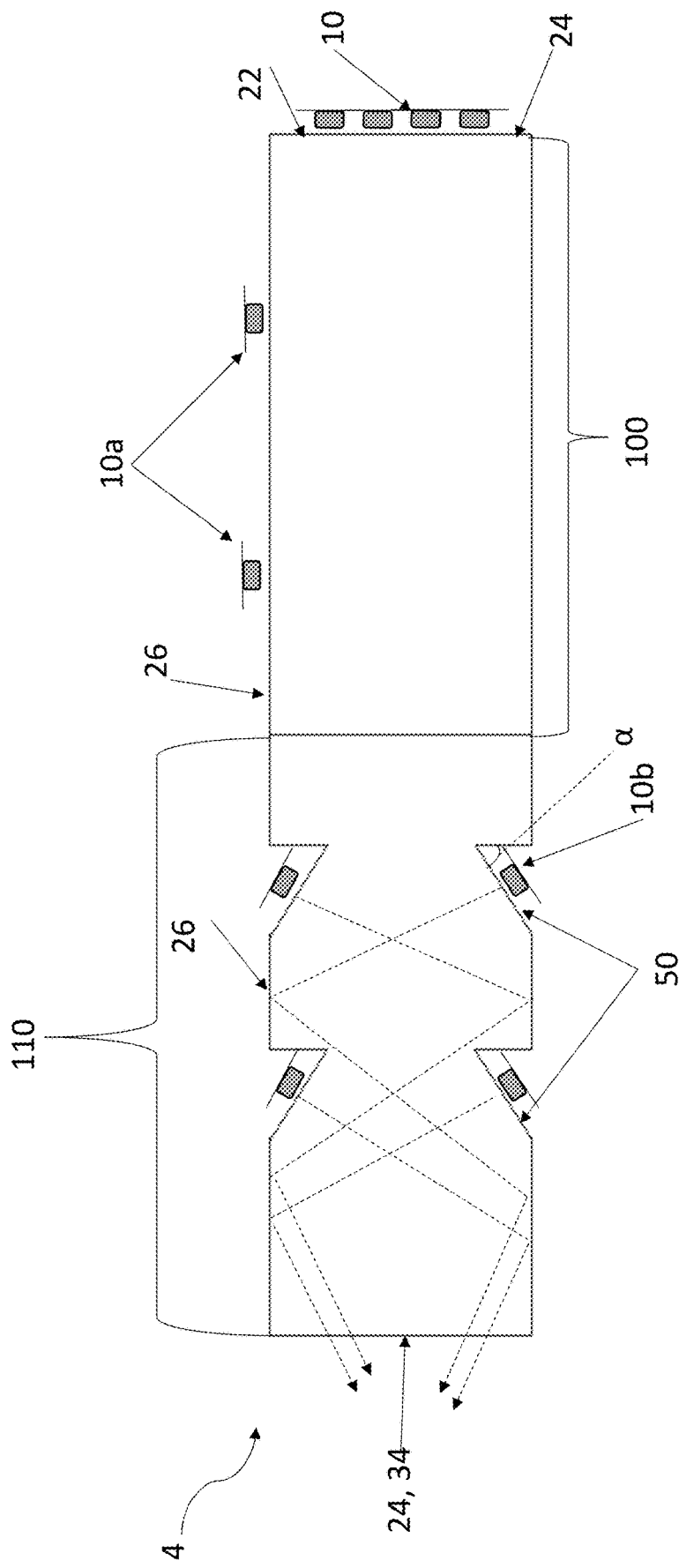
FIG. 4 shows a side cross-sectional view of a luminous device.

FIG. 4 illustrates a cross-sectional view of a luminous device 4. The luminous device has a first light region 100 and a second light region 110. The first light region 100 includes an end wall 24 and a side wall 26. A light source 10 is located adjacent to an end wall 24 of an optical element 22 of the luminous device 4 to direct light into the light source 10. Light sources 10a are located adjacent to the side wall 26 so that light is directed into the optical element 22 through the side wall 26. The second light region 110 includes a side wall 26 and an end wall 24 opposite the end wall 24 of the first light region 100. The side wall 26 includes light guides 50 that extend inward into the optical element 22. Light sources 10b are located within the light guides 50 and direct light at an angle (a) into the optical element 22. The extends through the side wall 26 via the light guide 50 and out the end wall 24, which is a directing region 34 of the optical element 22. The light guides 50 are annular recesses that extend into a side wall 26 of the optical element 22 so that a linear light source 10b extends partially or completely around an outside of the optical element 22.

Figure 5:
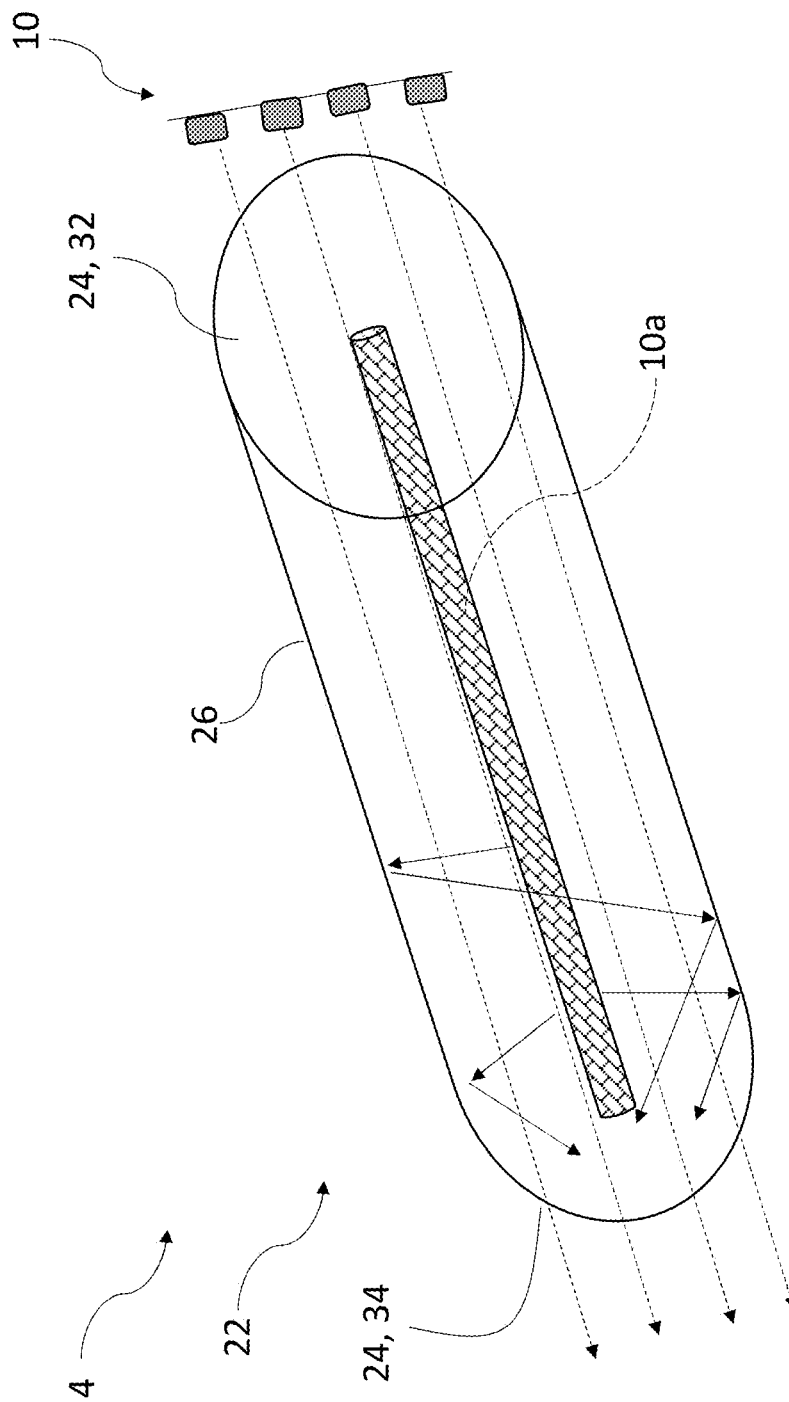
FIG. 5 is an isometric view of a luminous device.

FIG. 5 is an isometric view of a luminous device 4. The luminous device 4 includes an optical element 22 with two end walls 24 and a side wall 26 connecting the two end walls 24. A light source 10 is located adjacent to an end wall 24, which also is a receiving region 32 that guides light from the light source 10 into the optical element 22. A second light source 10*a* is encapsulated within the optical element 22 and provides light outward that is directed through the end wall 24, which is also a directing region 34.

FIG. 6A is a plan view of a luminous device 4. The luminous device 4 includes an optical element 22. The optical element 22 includes a light source 10 encapsulated within an optical material 52. The light source 10 is flexible and includes a light material 54 that encloses lights 56 therein. The light material 54 is flexible so that a shape of the light source 10 can match a shape of the optical element 22. The light source 10 may be placed within the optical element 22 so that the optical element 22 provides a homogenous lit appearance when the light source 10 is powered (e.g., on).

FIG. 6B is a cross-sectional view of the optical element 22 of FIG. 6A along line VIB-VIB. The optical element 22 includes an optical material 52 that encapsulates a light source 10. The light source 10 includes a light support 58 that supports one or more lights 56. The one or more lights 56 are covered by a light material 54. Light from the one or more lights 56 extends out of the optical material 52 through a directing region 34.

FIG. 7A is a cross-sectional view of a luminous device 2 with a light source 10 being partially located within an optical material 52 of an optical element 22. The light source 10 includes a light 56 located within a light material 54.

FIG. 7B is a cross-sectional view of a luminous device 4 with a first light source 10*a* and a second light source 10*b* being partially located within an optical material 52 of an optical element 22. The first light source 10*a* includes a light 56 located within a light material 54 and generates a light with a first color. The second light source 10*b* includes a light 56 located within a light material 54 that generates a second color. As shown, the optical element 22 may be formed in a geometric shape.

FIG. 7C is a cross-sectional view of a luminous device 4. The luminous device 4 has an irregular non-geometric shape. The luminous device 4 includes an optical element 22 with a light source 10 therein. The light source 10 is surrounded by optical material 52. The light source 10 includes a light 56 surrounded by light material 54.

FIG. 8 illustrates a method 300 of forming a luminous device. The method 300 includes a step of encapsulating one or more light sources within an optical material to form a light source 310. After encapsulation 310 the light source is operable to produce a light beam 320. The light source is places proximate to or within an optical material to form an optical element 330. The optical element is placed within a housing to form a luminous device 332.

Although the present disclosure provides references to figures, all embodiments shown in the figures are intended to explain preferred embodiments of the present invention by way of example rather than being intended to limit the present invention. Preferred embodiments of the present invention have been disclosed. However, it should be apparent to a person of ordinary skill in the art that certain modifications would come within the teachings of this invention and that various changes or modifications may be made in the present disclosure without departing from the principles and spirit of the disclosure, which are intended to be covered by the present invention as long as these changes or modifications fall within the scope defined in the claims and their equivalents.

We claim:

1. A luminous device comprising:
   first lights that produce a first light beam associated with a first photometric function of the luminous device, wherein the first lights are partially or completely located within and directly in contact with a first light material so that a surface of the first light material contacts a surface of the first lights forming a first light source;
   second lights that produce a second light beam associated with a second photometric function of the luminous device, wherein the second lights are partially or completely located within and directly in contact with a second light material so that a surface of the second light material contacts a surface of the second lights forming a second light source; and
   an optical element in communication with the first light source and the second light source so that the first light beams from the first light source are directed through the first light material and then through the optical element to a region around a vehicle to perform a first regulatory function, a signature function, or both and the second light source is in communication with the optical element so that the second light beams from the second light source are directed through the second light material and then through the optical element to a region around the vehicle to perform a second regulatory function, a signature function, or both,
   wherein the optical element receives both the first light beams from the first light source and the second light beams from the second light source.

2. The luminous device as claimed in claim 1, wherein the first light material, the second light material, or both are silicone and the first light material, the second light material, or both encapsulates the first lights and the second lights respectively.

3. The luminous device as claimed in claim 1, wherein the first light material, the second light material, or both are two or more layers that extend around all or a portion of the first light sources and the second light sources respectively.

4. The luminous device as claimed in claim 1, wherein the first light material encapsulates the first lights and the second light material encapsulates the second lights so that the first light sources are embedded entirely within the first light material and the second light sources are embedded entirely within the second light material.

5. The luminous device as claimed in claim 1, wherein the optical element comprises one or more receiving regions configured to receive the first light beam and a directing region configured to transmit the first light beam out of the optical element.

6. The luminous device as claimed in claim 5, wherein the optical element is made from a transparent material that allows light from the first light beam to extend through the first light material and light from the second light beam to extend through the second light material, into the optical element, and to extend from the one or more receiving region to the direction region to provide a first color and a second color, when the first lights and the second lights respectively are activated.

7. The luminous device as claimed in claim 1, wherein the optical element comprises a light diffusive portion that diffuses the first light beam, the second light beam, or both to produce a diffusive light pattern.

8. The luminous device as claimed in claim 7, wherein the light diffusive portion is configured to cover at least a part of a directing region.

9. The luminous device as claimed in claim 5, wherein the optical element includes a first optical portion that comprises at least one optical structure configured to optically couple with the first light sources to allow the first light beam to enter the optical element.

10. The luminous device as claimed in claim 9, wherein the at least one optical structures are flat surfaces on opposite ends of the optical element.

11. The luminous device as claimed in claim 9, wherein the at least one optical structures are formed as grooves formed in a surface of the optical element.

12. The luminous device as claimed in claim 1, wherein the first light source and the second light source each produce a different light beam so that two or more different photometric functions are provided by the luminous device.

13. The luminous device as claimed in claim 1, wherein the first light beam, the second light beam, or both entering the optical element are transmitted through the optical element by internal reflection.

14. The luminous device as claimed in claim 1, wherein the optical element is cylindrical or a hollow tubular structure.

15. The luminous device as claimed in claim 1, wherein the first light sources and the second light sources are directly embedded within the optical element.

16. A method comprising:
    disposing first lights partially or entirely within and in direct contact with a first light material forming a first light source;
    disposing second lights partially or entirely within and in direct contact with a second light material, that is different than the first light material, forming a second light source;
    disposing the first light source within an optical element to form a luminous device;
    disposing the second light sources within the optical element juxtaposed with the first light source to form the luminous device;
    directing a first light beam from the first light source into receiving regions of the optical element;
    directing a second light beam from the second light source into the receiving regions of the optical element;
    directing the first light beam, the second light beam, or both out of the optical element via direction regions of the optical element so that the luminous device produces a homogenous lit appearance by the optical element receiving both the first light beam and second light beam;
    providing a first regulatory function when the first light beam is directed into the receiving regions; and
    providing a second regulatory function when the second light beam is directed into the receiving regions.

17. The method as claimed in claim 16, further comprising:
    providing at least one first optical area configured to receive the first light beam, the second light beam, or both and at least one second optical area configured to transmit the first light beam, the second light beam, or both out of the optical element.

18. The method as claimed in claim 16, further comprising:
    embedding all or portion of the first lights within the first light material so that the first lights are directly in contact with the first light material.

19. The method as claimed in claim 18, wherein the method comprises forming a light diffusive portion on or within the optical element to produce a diffusive light pattern.

20. The method as claimed in claim 16, further comprising:
    wrapping the first light source and the second light source around the optical element so that the optical element and the first light source and the second light source are connected.

* * * * *